United States Patent
Bachman et al.

(10) Patent No.: US 8,618,914 B2
(45) Date of Patent: Dec. 31, 2013

(54) MEMS SENSOR ENABLED RFID SYSTEM AND METHOD FOR OPERATING THE SAME

(75) Inventors: Mark Bachman, Irvine, CA (US); Yang Zhang, Irvine, CA (US); Scott McLaughlin, Irvine, CA (US)

(73) Assignee: The Regents of the University of California, Oakland, CA (US)

( * ) Notice: Subject to any disclaimer, the term of this patent is extended or adjusted under 35 U.S.C. 154(b) by 307 days.

(21) Appl. No.: 12/984,451

(22) Filed: Jan. 4, 2011

(65) Prior Publication Data

US 2011/0163850 A1 Jul. 7, 2011

Related U.S. Application Data

(60) Provisional application No. 61/292,464, filed on Jan. 5, 2010.

(51) Int. Cl.
*H04Q 5/22* (2006.01)
*G08B 17/00* (2006.01)
*G08B 21/00* (2006.01)
*H01C 7/00* (2006.01)
*G08B 13/14* (2006.01)

(52) U.S. Cl.
USPC .......... 340/10.1; 340/584; 340/589; 340/540; 340/572.1; 340/572.2; 340/572.3; 340/572.4; 340/572.5; 340/572.6; 340/572.7; 340/572.8; 340/572.9; 338/13

(58) Field of Classification Search
None
See application file for complete search history.

(56) References Cited

U.S. PATENT DOCUMENTS

| | | | |
|---|---|---|---|
| 8,269,633 B2 * | 9/2012 | Hollander et al. | 340/572.8 |
| 2006/0152313 A1 * | 7/2006 | Zmood | 335/208 |
| 2007/0024410 A1 * | 2/2007 | Yazdi | 338/13 |
| 2011/0068922 A1 * | 3/2011 | Ross | 340/572.1 |

FOREIGN PATENT DOCUMENTS

EP 1600749 A1 * 11/2005

* cited by examiner

*Primary Examiner* — Steven Lim
*Assistant Examiner* — Omeed Alizada
(74) *Attorney, Agent, or Firm* — Marcus C. Dawes; Daniel L. Dawes

(57) ABSTRACT

An apparatus provides environmental monitoring of an item and includes an RFID tag, and a passive switch for sensing an environmental parameter to which the item is subjected, and coupled to the RFID tag so that a measurement of the sensed environmental parameter can be stored, the RFID tag for providing remote readout of the sensed environmental parameter. A method provides environmental monitoring of an item and includes the steps of sensing an environmental parameter to which the item is subjected with activation of a passive switch, storing a measurement of the sensed environmental parameter upon the event of activation of the passive switch, and providing remote readout of the measurement of the sensed environmental parameter with an RFID tag.

18 Claims, 8 Drawing Sheets

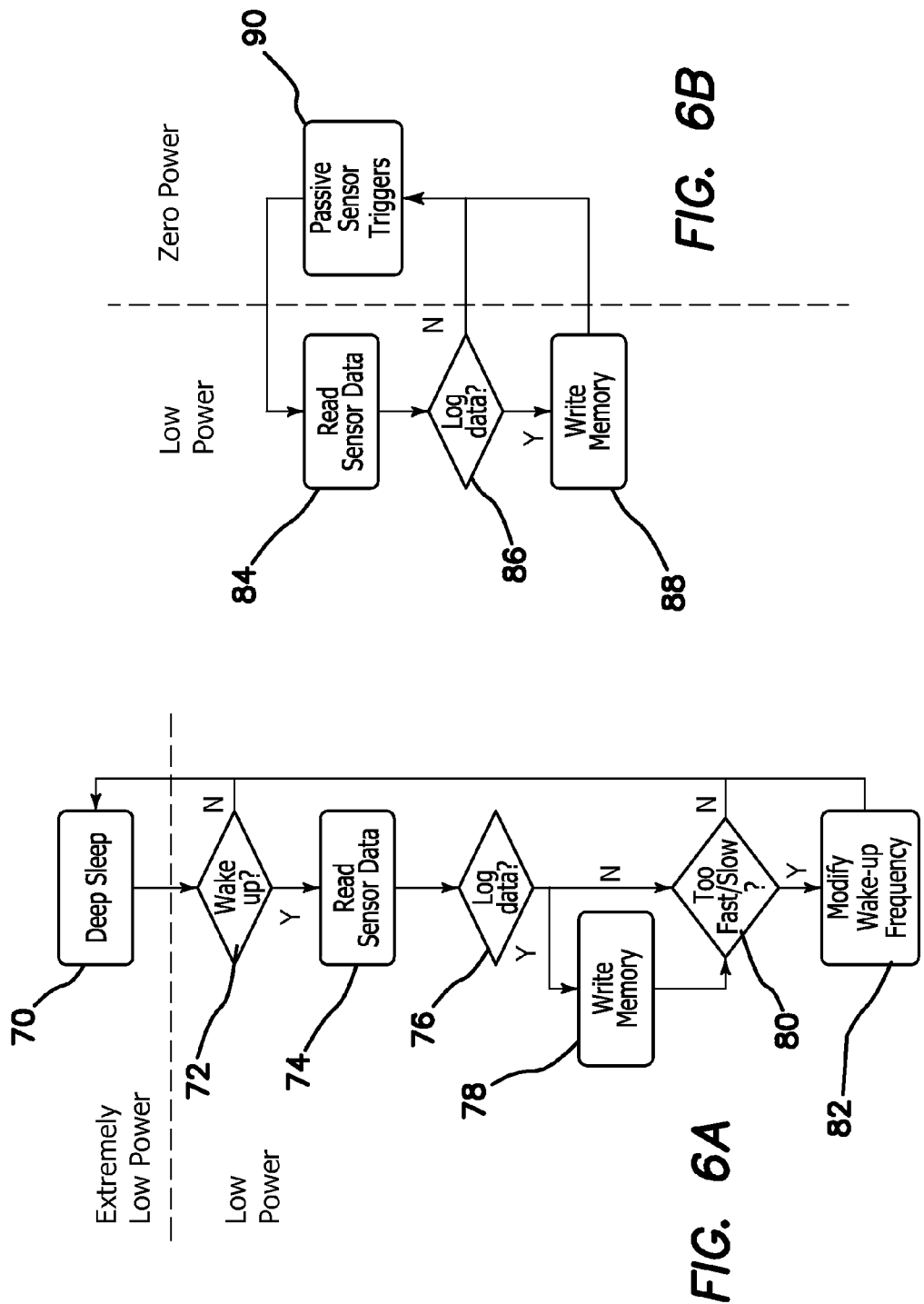

MEMS SENSOR ENABLED RFID SYSTEM AND METHOD FOR OPERATING THE SAME

RELATED APPLICATIONS

The present application is related to U.S. Provisional Patent Application Ser. No. 61/292,464, filed on Jan. 5, 2010, which is incorporated herein by reference and to which priority is claimed pursuant to 35 USC 119.

GOVERNMENT RIGHTS

This invention was made with government support under contract no. NSF-STTR 0923921 awarded by the National Science Foundation. The government has certain rights in the invention.

BACKGROUND OF THE INVENTION

1. Field of the Invention

The illustrated embodiments of the invention relate to an apparatus and method to provide item-level monitoring of environmental qualities or histories, including, but not limited to, temperature, humidity, air gas components, radiation.

2. Description of the Prior Art

Advancements in materials science, micro fabrication of MEMS, and bioengineered systems have made inexpensive, powerful, and ubiquitous sensing a reality. Examples range from truly smart airframes, self-evaluating buildings, and infrastructure for natural hazard mitigation to large scale weather forecasting. New detection technologies that overcome barriers of time, scale, materials, and environment, and emphasize self-calibration, selectivity, and sensitivity are required. Sensor networks that are ad hoc, multi-hop, robust, and low-power need further development. The convergence of communications, nanotechnologies, advanced materials, and information technologies with miniaturization techniques has placed sensor technology at the threshold of a period of major growth. New sensor technologies appear very promising, but unfortunately most sensors are energy hungry and have a very short battery life. The cost and maintenance of large numbers of wireless and autonomous distributed sensors has become a major issue in the micro sensor field.

For example, in the medical industry, tracking of individual items is of utter importance, particularly in the distribution of blood, organs, or other biologicals. With these items, it is further critical to monitor item level environmental variables such as temperature, shock, and humidity. For whole blood and blood components, the optimal temperature for storage has been found to be 4° C., with increased haemolysis at temperatures below 0° C. and above 10° C. Radio Frequency Identification (RFID) is a burgeoning technology that has been widely adopted to replace barcodes in inventory tracking and supply chain management. RFID permits tracking of individual units of blood (or components) through the entire cold chain and distribution network. Systems implemented with RFID showed vast improvements in patient safety from barcode tracking systems. Active and semi-passive tags have been used in hospital studies to monitor blood components, showing the utility of individual monitoring of blood units. To date, such studies have not achieved the price point necessary for individual tagging.

In the past, the cold chain management is mainly done by centralized refrigerating facilities with temperature monitoring at budding, vehicle and carton levels. For critical commodities like blood bags, there are not existing solutions to monitor individual items at relative lower cost. Currently, many institutions have a "30-minute rule" wherein blood that has been outside the blood bank for more than 30 minutes may be considered unsafe for transfusion if returned above a temperature of 10° C. Similar operator decision is involved for transportation of other commodities. Examples of relevant prior technology include: "Resettable Latching Mems Temperature Sensor Apparatus And Method" U.S. Pat. No. 7,239,064 (2005), and "Method And System For Monitoring Environmental Conditions" U.S. patent application Ser. No. 11/383,200 (2006).

The optimal temperature for the storage of whole blood and many blood components has been found to be 4° C., with increased haemolysis at temperatures below 0° C. and above 10° C. Bacterial contamination of blood and blood components has been found to be the major risk factor in transfusion medicine. In 2004, Sharma et al. found the storage conditions within the blood bank are well controlled. Blood bags that had been issued and returned, conversely, were found to have a 3.92% rate of contamination (Sharma R R, Subramanian P G, Kumar S, Singh M, Sharma M, Agnihotri S K, Marwaha N. Evaluation of storage conditions and bacterial proliferation in blood components. Lab Med 2004 October; 35(10):616-9.). This indicates a need for increased attention to conditions imparted while blood is outside the blood bank, with temperature being the most important factor.

RFID tags are available as active, passive, or semi-passive, and operate at differing frequencies depending upon the application. RFID tags are available as active, passive, or semi-passive, and operate at differing frequencies depending upon the application. Semi-passive (or -active) tags use a small battery for sensing or other functions, but not for data transmission. This project falls under the category of semi-passive, but could potentially be much less expensive than existing semi-passive tags. 13.56 MHz tags are used here as they provide reasonable read distance and operation in the proximity of liquids and metals.

BRIEF SUMMARY OF THE INVENTION

The illustrated embodiment of the invention include a zero-power sensor triggered radio frequency identification system for long-term, item-level environmental data monitoring and recording. The sensor system integrates passive micro-sensors that are actuated as electrical switches at thresholds of environmental conditions, such as temperature, pressure and acceleration. The onboard data collection and storage components are powered only when those thresholds are exceeded. When a detector receives radio frequency signals at the sensor system, the reflected radiation provides the product information and environmental history.

The illustrated embodiments of the invention include a method and apparatus in which RFID tags are combined with MEMS bi-material cantilevers to provide item-level environmental monitoring. The MEMS cantilevers can be fabricated directly on a flexible printed circuit board for temperature, humidity, acceleration and orientation sensing. Additionally, the cantilever act as a power switch for a control circuitry of an RFID chip that functions as zero-power memory elements. A specific tag can be interrogated for any past event that a set environmental condition has been exceeded. This system uses zero power to monitor temperature, and zero power to store memory. Power is only used to change the memory element. Tags are applicable to, but not limited to, biological and medical inventory monitoring, and distribution of blood, organs and other biologicals.

The illustrated embodiment described herein provides an economic solution to monitor environmental history of individual, perishable items over a prolonged time during transportation and distribution. Any item experiencing a hostile environment for an extended period of time can be rejected through an RFID screening conducted by the recipient of the item. The identification of usable and unusable items can be done with high accuracy through this method. This embodiment is applicable to any item level of environmental monitoring need. It is especially useful for transportation of high value items the quality of which is subject to environmental conditions or history. The sensor enabled RFID tag is first applied to individual items and then activated for monitoring before the shipment. At the recepient's end, an RFID interrogater device is used to screen individual items. Items that have experienced predefined extensive hostile conditions are reported by the RFID chip and rejected from further usage.

More specifically, the illustrated embodiments of the invention Include an apparatus for providing environmental monitoring of an item comprising an RFID tag, and a passive switch for sensing an environmental parameter to which the subjected, and coupled to the RFID tag so that a measurement of the sensed environmental parameter can be stored, the RFID tag for providing remote readout of the sensed environmental parameter.

The passive switch senses temperature, pressure, humidity, or acceleration.

The apparatus further comprises a memory element coupled to the switch to store the sensed environmental parameter.

The apparatus further comprising a switch into which the cantilever indicates whether a threshold value of the sensed environmental parameter has been reached or exceeded.

The switch comprises a MEMS bi-material cantilever and where the sensed environmental parameter is temperature. In one embodiment the threshold value of the sensed environmental parameter is a maximum permitted temperature. In another embodiment the threshold value of the sensed environmental parameter is a minimum permitted temperature.

The apparatus further comprises a plurality of switches for sensing a corresponding plurality of environmental parameters to which the item is subjected, the plurality of switches being coupled to the RFID tag for recordal of the plurality of environmental parameters and to provide remote readout of the sensed plurality of environmental parameters.

The apparatus further comprises a flexible printed circuit board on which the RFID tag and passive switch are mounted, the passive switch being fabricated directly on the flexible printed circuit board for temperature, humidity, acceleration or orientation sensing.

The plurality of switches are arranged and configured to sense whether a temperature range has been maintained at all times for the monitored item.

The tag is arranged and configured to provide a readout and record if any past event characterized by at least one of a plurality of sensed environmental parameters signified that a predefined environmental condition has been exceeded.

The passive switch is integrated directly into the RFID tag. In one embodiment the passive switch is integrated into a flexible PCB with the RFID tag.

The apparatus further comprises high resolution active sensors of an environmental parameter coupled to the RFID tag and activated by the passive switch.

The illustrated embodiments of the invention include a method for providing environmental monitoring of an item comprising the steps of sensing an environmental parameter to which the item is subjected with activation of a passive switch, storing a measurement of the sensed environmental parameter upon the event of activation of the passive switch, and providing remote readout of the measurement of the sensed environmental parameter with an RFID tag.

In one embodiment the item is a biological or medical item and the method further comprises the step of storing information in the RFID tag specifically relating to the biological or medical item to provide the information combined with stored sensed environmental parameters to which the item has been subject for inventory monitoring or distribution of blood, organs and biological materials.

The step of providing remote readout of the measurement of the sensed environmental parameter with an RFID tag comprises providing an environmental history of individual, perishable items over a prolonged time during transportation and distribution.

The method further comprises the step of rejecting any item experiencing a hostile environment for an extended period of time through an RFID screening conducted by a recipient of the item.

The method further comprises the steps of sensing a plurality of environmental parameters to which the item is subjected with selective activation of at least one of a corresponding plurality of passive switches, storing a corresponding plurality of measurements of the sensed environmental parameters upon activation of at least one of a corresponding plurality of passive switches, and providing remote readout of the plurality of measurements of the sensed environmental parameters with an RFID tag, where the plurality of switches are arranged and configured to sense whether a predetermined environmental parametric range has been maintained at all times for the monitored item.

While the apparatus and method has or will be described for the sake of grammatical fluidity with functional explanations, it is to be expressly understood that the claims, unless expressly formulated under 35 USC 112, are not to be construed as necessarily limited in any way by the construction of means or "steps" limitations, but are to be accorded the full scope of the meaning and equivalents of the definition provided by the claims under the judicial doctrine of equivalents, and in the case where the claims are expressly formulated under 35 USC 112 are to be accorded full statutory equivalents under 35 USC 112. The invention can be better visualized by turning now to the following drawings wherein like elements are referenced by like numerals.

Each of the additional features and teachings disclosed below can be utilized separately or in conjunction with other features and teachings to provide a system and method for item-level environmental monitoring. Representative examples of the present invention, which examples utilize many of these additional features and teachings both separately and in combination, will now be described in further detail with reference to the attached drawings. This detailed description is merely intended to teach a person of skill in the art further details for practicing preferred aspects of the present teachings and is not intended to limit the scope of the invention. Therefore, combinations of features and steps disclosed in the following detail description may not be necessary to practice the invention in the broadest sense, and are instead taught merely to particularly describe representative examples of the present teachings.

Moreover, the various features of the representative examples and the dependent claims may be combined in ways that are not specifically and explicitly enumerated in order to provide additional useful embodiments of the present teachings. In addition, it is expressly noted that all features disclosed in the description and/or the claims are intended to be disclosed separately and independently from each other for the purpose of original disclosure, as well as for the purpose of restricting the claimed subject matter independent of the compositions of the features icy the embodiments and/or the claims. It is also expressly noted that all value ranges or indications of groups of entities disclose every possible intermediate value or intermediate entity for the purpose of original disclosure, as well as for the purpose of restricting the claimed subject matter.

BRIEF DESCRIPTION OF THE DRAWINGS

FIG. 1a shows the tag on a critical package and a conventional RFID reader. FIG. 1b is a high level block diagram of the tag's principal electrical components. FIG. 1c is a diagram illustrating the use of the system in monitoring chain of custody environmental conditions in the case of an application to blood transfusion units.

FIG. 4b are plan top views of the three PCB layers which comprise the sensor switch of FIG. 4a.

FIG. 5 illustrates the fabrication steps to make a fully integrated sensor RFID switch of FIG. 3a.

FIGS. 6a and 6b are flow diagrams of firmware controlled energy saving modes of operation for the tag.

The invention and its various embodiments can now be better understood by turning to the following detailed description of the preferred embodiments which are presented as illustrated examples of the invention defined in the claims. It is expressly understood that the invention as defined by the claims may be broader than the illustrated embodiments described below.

DETAILED DESCRIPTION OF THE PREFERRED EMBODIMENTS

The illustrated embodiment of the invention relates to a system and method to provide item-level monitoring of environmental quantities including, but not limited to, temperature, humidity, air gas components, radiation, pressure and acceleration. This disclosure contains a scalable RFID platform that is triggered by passive sensors and drains power only during data logging. Flexible printed circuit board compatible sensors and active microelectronics are integrated with RF antenna coils. The embodiment applies to supply chain management of medical supplies, industrial samples, commercial products and personal items that are of critical values and sensitive to environment change. Another multi-use market for the proposed technology is to support homeland security, in particular border and transportation security efforts. Wireless remote sensing is an important field of technology development that can address a number of needs for commercial and private sector applications, including identification of various toxic gases, biological threat agents, explosives, and environmental pathogens. Environmental and regulatory uses exist in the detection of chemical leaks, contaminants, and illegal storage of hazardous materials.

Figure 1A:
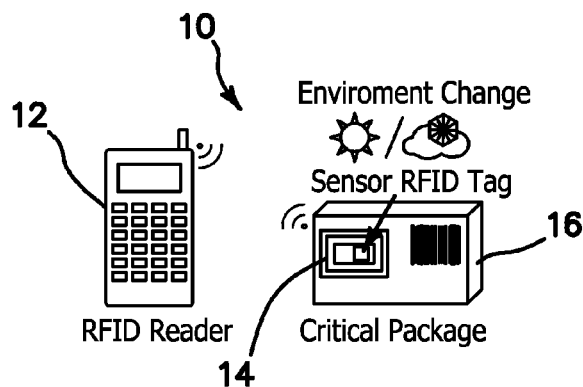
FIGS. 1a-1c are diagrams of an illustrated embodiment of the sensor RFID tag system for temperature monitoring.
Figure 1B:
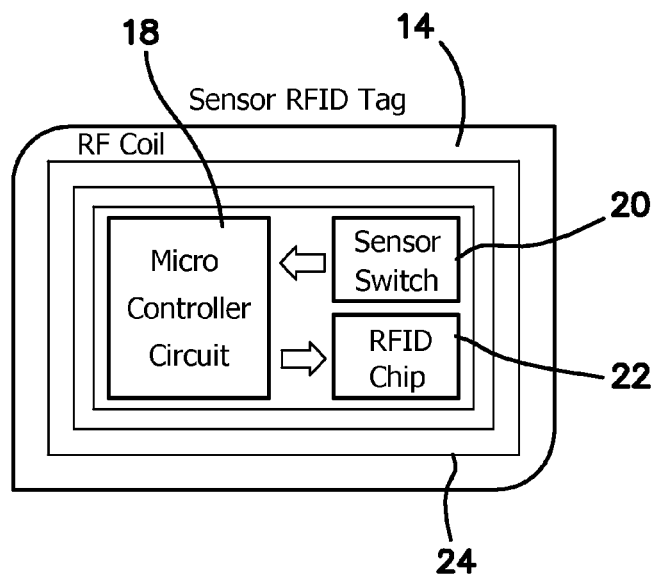
Figure 1C:
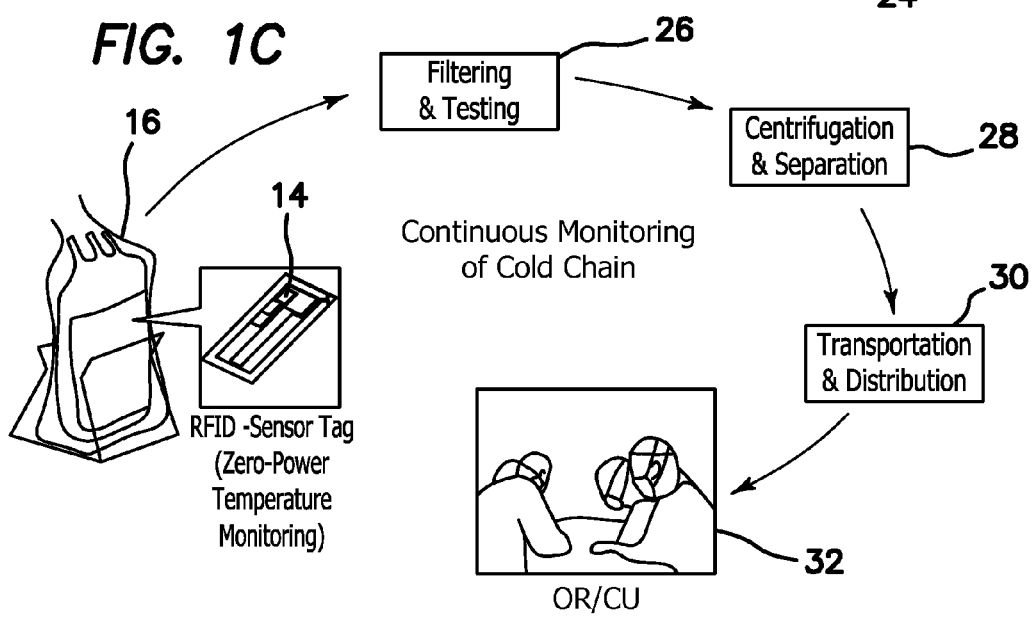

FIGS. 1a-1c illustrate the general context of the illustrated embodiment of the invention. FIG. 1a depicts a sensor RFID system, generally denoted by reference numeral 10, which includes an RFID reader 12 and a sensor tag 14 attached to a package 16 containing the environmental or time critical element or object. FIG. 1b is a diagram of the RFID tag 14 of FIG. 1a and includes a microcontroller circuit 18 coupled to a sensor switch 20 and RFID circuit 22, which in turn is coupled to an RF coil antenna 24. FIG. 1c is a diagram illustrating the use of the system 10 during comprehensive monitoring of blood donations. A blood package 16 carrying tag 14 is continuously monitored and its history reported out during subsequent handling phases, such a filtering and testing phase 26, centrifugation and separation phase 28, transportation and distribution phase 30, and end use in an OR or ICU at phase 32.

Consider first a generic sensor platform design that enables long-term, item-level environmental monitoring and data logging, which can be further specified for a variety of applications. Using a MEMS bimorph temperature sensor, zero power is used except in the short time period when the threshold is exceeded, and while a memory element is being changed. Once this memory element is modified, zero power is needed to maintain its state. With this scheme, a sensor RFID tag 14 is only limited by the shelf-life of its battery, potentially enabling the use of smaller, less expensive batteries than other types of tags. During standard inventory readings, temperature violations are immediately detected, and proper actions can then be implemented.

Figure 2:
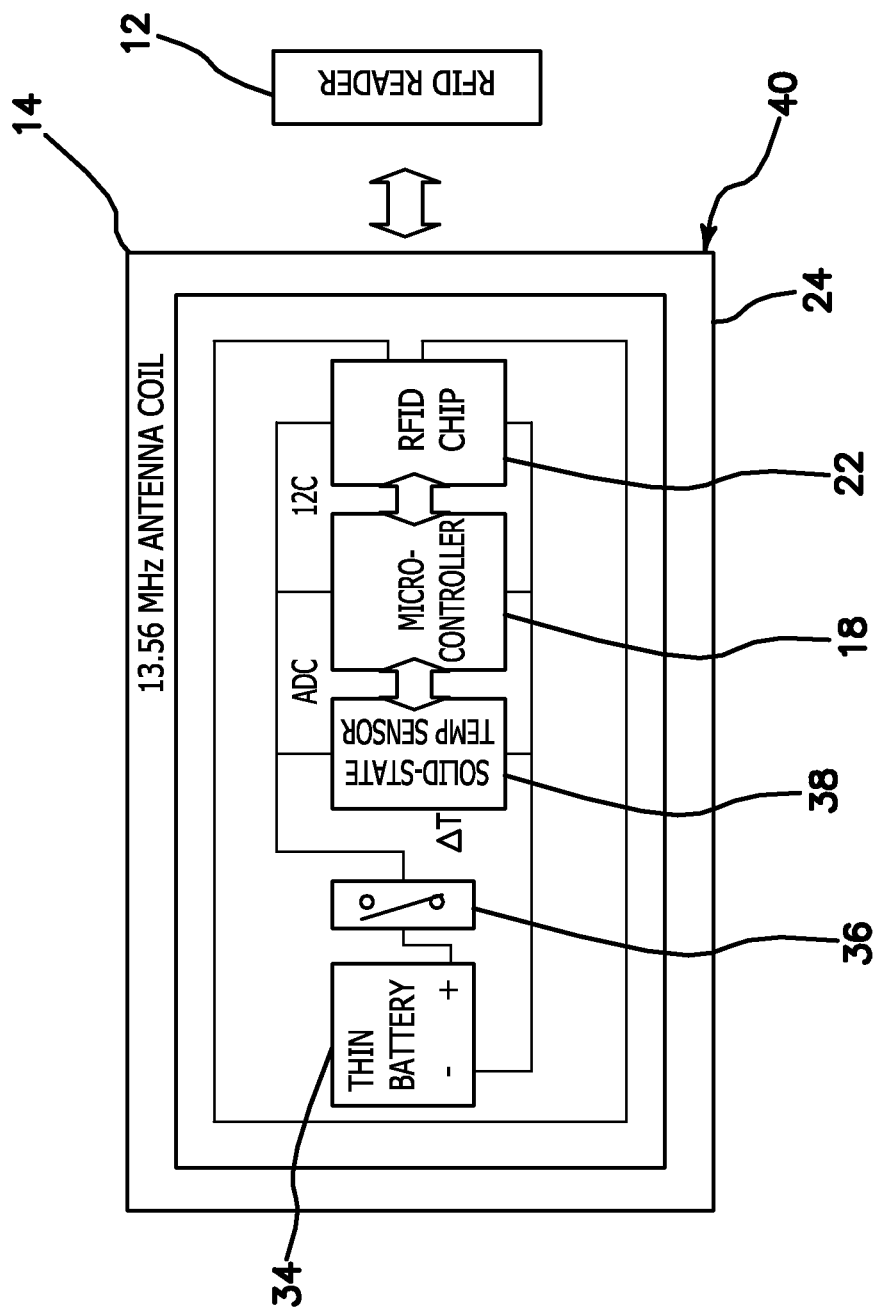
FIG. 2 is a block diagram of major components of an embodiment of the RFID tag, utilizing a passive sensor switch to activate the system in order to preserve power. Data is registered in the EEPROM and retrieved by the RFID reader wirelessly.

With RF access and direct in-line access RFID chips, microcontrollers 18 can write directly to an included EEPROM memory when environmental data is recorded. The RFID chip 22 is then interrogated by the reader 12 to retrieve data. A block diagram overview of the tag 14 is illustrated in FIG. 2. There are two modes of operation to maximize monitoring time with an on-board thin-film battery 34. First, there is a passive sensor trigger mode where a passive sensor 36 triggers the tag 14 at threshold conditions to record environmental data and then shuts down tag 14 to conserve energy. Low resolution passive sensor 36 is coupled to battery 34 and provides switched power to a high resolution solid state temperature sensor 38, micro-controller 18 and RFID chip 22 when the threshold condition is met, e.g. when a $\Delta T$ is achieved. Solid state temperature sensor 38 may generate an analog temperature signal which is converted into digital form and coupled to microcontroller 18. Solid-state sensors 38 can be integrated in the system 10 for increased resolution of sensing. In general they consume a small fraction of the total power. For example, a solid-state temperature sensor 38, National Semiconductor LM20, has extremely low power consumption (<10 μA) and small package for integration 1 mm$^2$). Thin film batteries 34 from several manufacturers have been identified to be suitable sensor RFID applications. The batteries 34 can be recharged every time a shipment is scanned, as a way to regenerate the battery automatically.

Second, there is a cyclic monitoring mode where a cyclic sleep and wake-up operation of the entire tag 14 samples environmental data at fixed or adjustable intervals. With a record of temperature profile, the microcontroller reprograms sleep duration depending on the rate of change. More rapid changes in environmental condition wake up the system more frequently.

FIGS. 6a and 6b are flow charts for two different energy-saving modes for the RFID tag 14. FIG. 6a illustrates a cyclic-sleep mode where the RFID tag 14 is scheduled to wake up from an extremely low-power mode. The "Deep Sleep" corresponds to when the tag 14 is inactive and consumes microamperes of electric current from the battery 34. The environmental data stored in the memory is utilized to adjust the awakening frequency of the system. When environmental conditions are changing quickly with potential hazards, the tag 14 is switched on more often to closely monitor the changes.

For example, as shown in FIG. 6a tag 14 is operated at an extremely low power level at step 70. An inquiry is made at step 72 whether to wake up tag 14 or not to operate in a higher state of activity and hence power consumption. If the wake-up frequency which is set, indicates that it is time to wake up or begin operation, a determination of Yes or Y is made at step 72 and the sensor data is read at step 74. A determination is made whether to log the data or time-dated and store it at step 76. If a determination of Yes or Y is made at step 76, the data is written into memory at step 78, otherwise processing goes to step 80. In either case a determination is made at step 80 whether the data values are changing at a rate that justifies increasing or decreasing the frequency of wake ups. If a change in the frequency of wake ups is to be made, a determination of Yes or Y is made at step 80 and the wake-up frequency is modified at step 82, and in either case tag 14 is returned to its deep sleep operational mode at step 70.

On the other hand, FIG. 6b illustrates a scenario when passive sensors, rather than active sensors, are in place to trigger the system on. Zero power is consumed during stand-by mode. For example, tag 14 is in a nonoperating condition and utilizing zero power. The passive sensor 36 triggers on the event of an environmental event at step 90. This turns on tag 14 which then reads the sensor data or status at step 84 by operating in a low power mode. A determination is made at step 86 whether or not to log the data at step 86, i.e. was a threshold exceeded or has the data value changed since the last logged value. If a determination is made that the data is to be logged, then the data is stored into memory as step 88. In either case, tag 14 then returns to the non-operational mode to step 90. The tag 14 continues to cycle as long as the passive switch 36 is activated, but only a change in the data value will be logged.

Thus, the illustrated embodiment of system 10 can be understood to include a tag 14 having at least one passive environmental sensor 36, various active components 38, 18, 22, a power source 34, and a printed circuit package 40 in which the various elements are coupled, and the RFID reader 12. One embodiment of the RFID system 10 includes a dual communication RFID chip 22 with supporting passives. RFID chips 22 are available as active, passive, or semi-passive, and operate at differing frequencies depending upon the application. Semi-passive (or active) tags 14 use a small battery 34 for sensing or other functions, but not for data transmission between the reader 12 and the tag 14. One supporting passive device for dual communication RFID chip 22 is a passive slave memory device with 64 Kbit electrically erasable programmable memory (EEPROM), which can be read and write through either one of two interfaces, e.g. an I2C interface or an RF interface. In the I2C interface, direct connections are used to support a 400 kHz I2C interface protocol. In the RF interface, the interface contains 64-bit unique identifier (UID) for easy tracking. Traditional 13.56 MHz RFID data protocol and RF powered reading are retained hi chip 22. For security, the device has programmable password protection in both I2C and RF interfaces. RFID readers 12 complying with the same communication protocol and data encryption of the RFID chip 22 can be used for sensor RFID tags 14.

Currently, the smallest available package is 2×3 mm. Microchip® PIC of Microchip Technology Inc., Chandler, Ariz., microcontrollers are programmed to communicate with the RFID chip 22 through the I2C protocol. Thin film battery 34 can provide energy for more than 200 days of continuous temperature monitoring, which is significantly longer than the blood expiration time in hostile temperatures. Passive sensor switch 36 can be configured by design choice to conduct or break an electric circuit as environmental conditions change. A passive microswitch 36 made of polymeric or metallic bimorph materials, for example, close or open a circuit as a predetermined temperature threshold is reached. Other types of microsensor switches can be configured or used as sensors for pressure, acceleration, chemical or humidity.

Figure 3A:
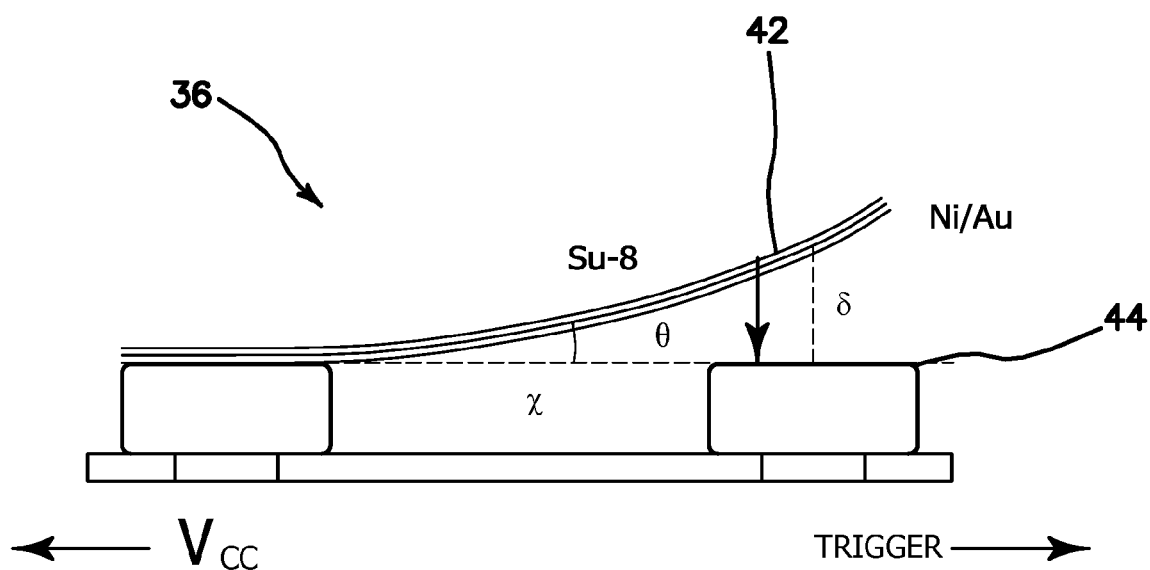
FIG. 3a is a side cross-sectional view of a temperature sensing MEMS switch.

For example, as shown in FIG. 3a a bimorph micro cantilever switch 36 is based upon the thermal expansion of two materials that are laminated together to form cantilever 42, which is used as an electric switch 36 if at least one of the materials is conductive, and the cantilever 42 is positioned such that it will contact a terminal 44 at a predetermined temperature or higher. The MEMS temperature sensing switch 36 shown in FIG. 3a, shows that the initial stress during MEMS fabrication causes the bimorph cantilever 42 to curve up. With the higher CTE material situated above the lower, the displacement of the cantilever 42 results in electrical contact with terminal 44 with increased temperature. The desired temperature is adjusted by selecting the length of the cantilever 42, or selectively positioning of the terminal 44 under the curving cantilever 42. The dependence of the displacement ($\delta$) of the distal end of a cantilever 42 with length x displaced with a curvature $\kappa$ ($R^{-1}$) is given by $$\delta = x\tan(\theta) \approx x\sin(\theta) \approx x^2\kappa \qquad (1)$$

$$= x^2 \frac{6(\alpha_{High} - \alpha_{Low})\Delta T}{h} \frac{a+1}{E^* a^3 + 4a^2 + 6a + 4 + \frac{1}{E^*}}$$

where '$\theta$' is the small deflected angle, 'R' ($\kappa^{-1}$) is the bending radius, '$\alpha$' is the coefficient of thermal expansion (CTE), 'h' is the thickness of the higher CTE layer, 'a' is the ratio of thickness between low CTE material and high CTE material, '$\Delta T$' is the variation of temperature and '$E^*$' is the ratio of Young's Modula of the two bimorph layers.

Eq. (1) shows that an array of sensor cantilevers 42 with different lengths, x, can be used to determine multi-point thresholds for finer control of certain scenarios, such as monitoring packages 16 with upper and lower temperature limits simultaneously.

Figure 3B:
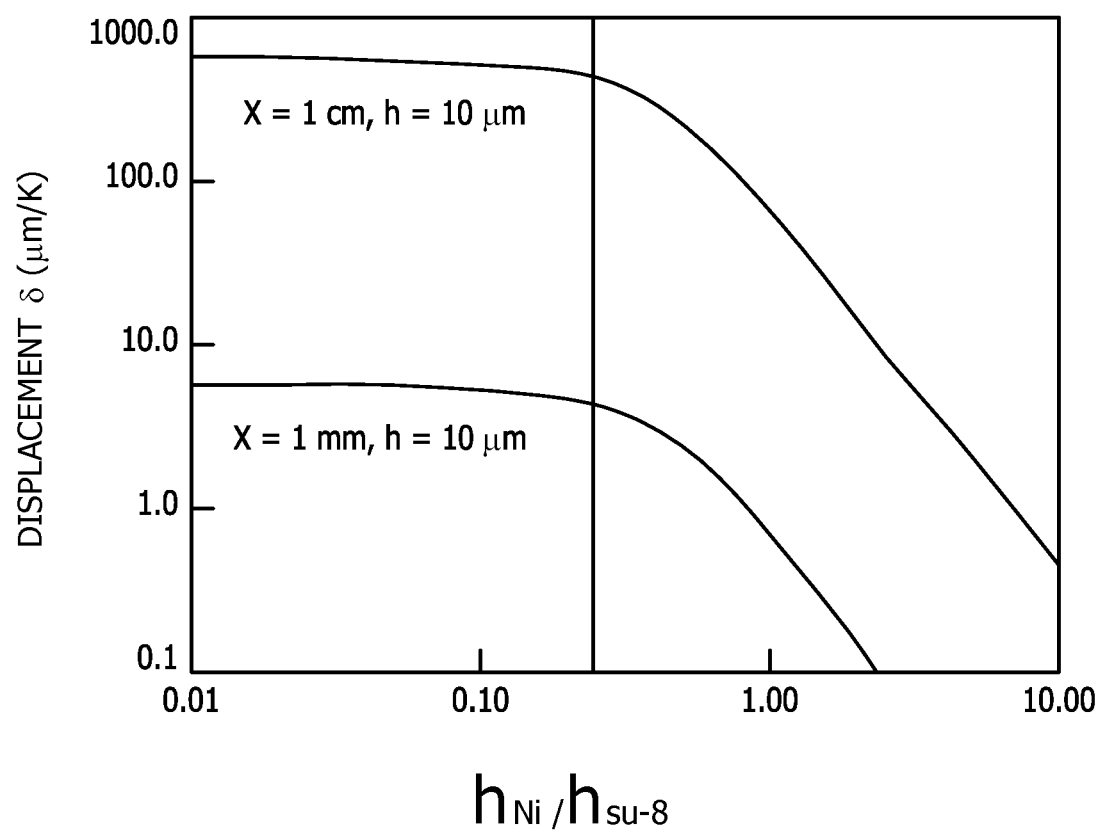
FIG. 3b is a graph of the theoretical plot for switching stroke or displacement of the switch of FIG. 3a for cantilevers of length 1 mm and 1 cm with the same width of 10 μm as a function of the ratio of the bimorph layer thicknesses for a Ni/Su-8 bimorph.

Eq. (1) predicts stronger bimorph deflection under larger change of temperature, larger difference in CTE, thinner layers and smaller ratio of thickness as shown in the graph of FIG. 3b. FIG. 3b plots the displacement of two different cantilever lengths versus the ratio of thickness of the bimorph layers. While most MEMS sensors are based upon silicon processes, a laminate process described below in connection with FIG. 5, such as disclosed in U.S. Pat. No. 7,084,724, incorporated herein by reference, is used hi this embodiment to seamlessly integrate the sensors with the flexible printed circuit board. Su-8 photoresist is chosen as one of the bimorph layer because of its high CTE. EPON™ resin epoxy 1002F from Hexion Specialty Chemicals, Inc. of Columbus, Ohio, may also be considered as a less expensive replacement. For the other layer, nickel and gold stand out with the largest difference in CTE as well as being easy to electroplate and resistant to most copper etchants.

Figure 4A:
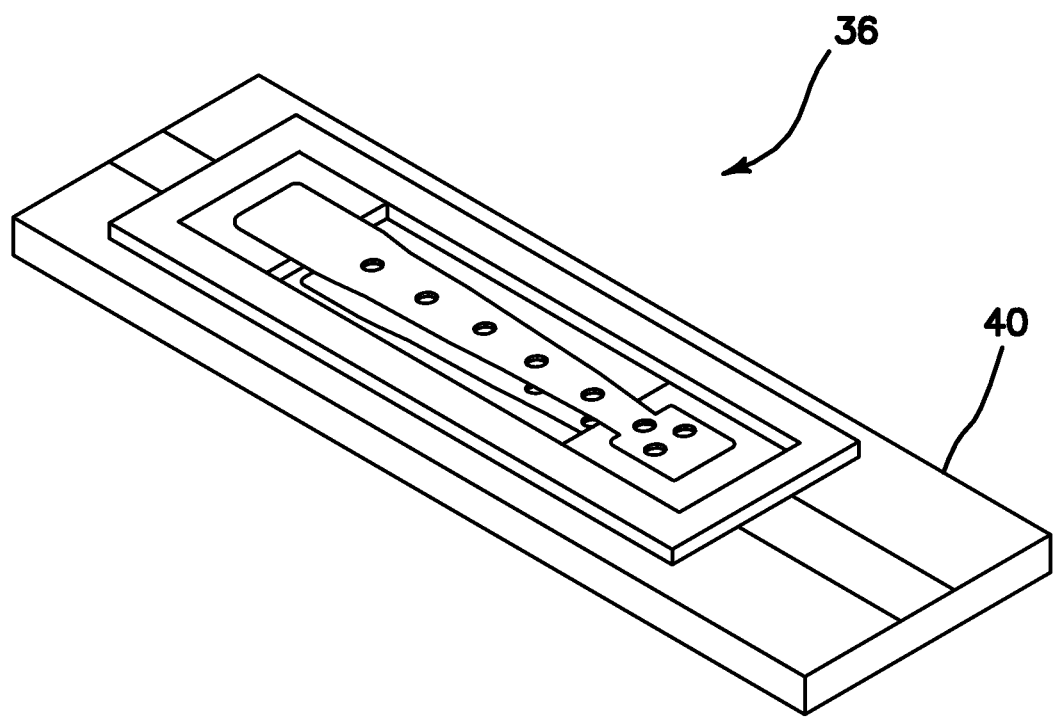
FIG. 4a is a perspective view of a bimorph temperature sensor switch on a printed circuit board.
Figure 4B:
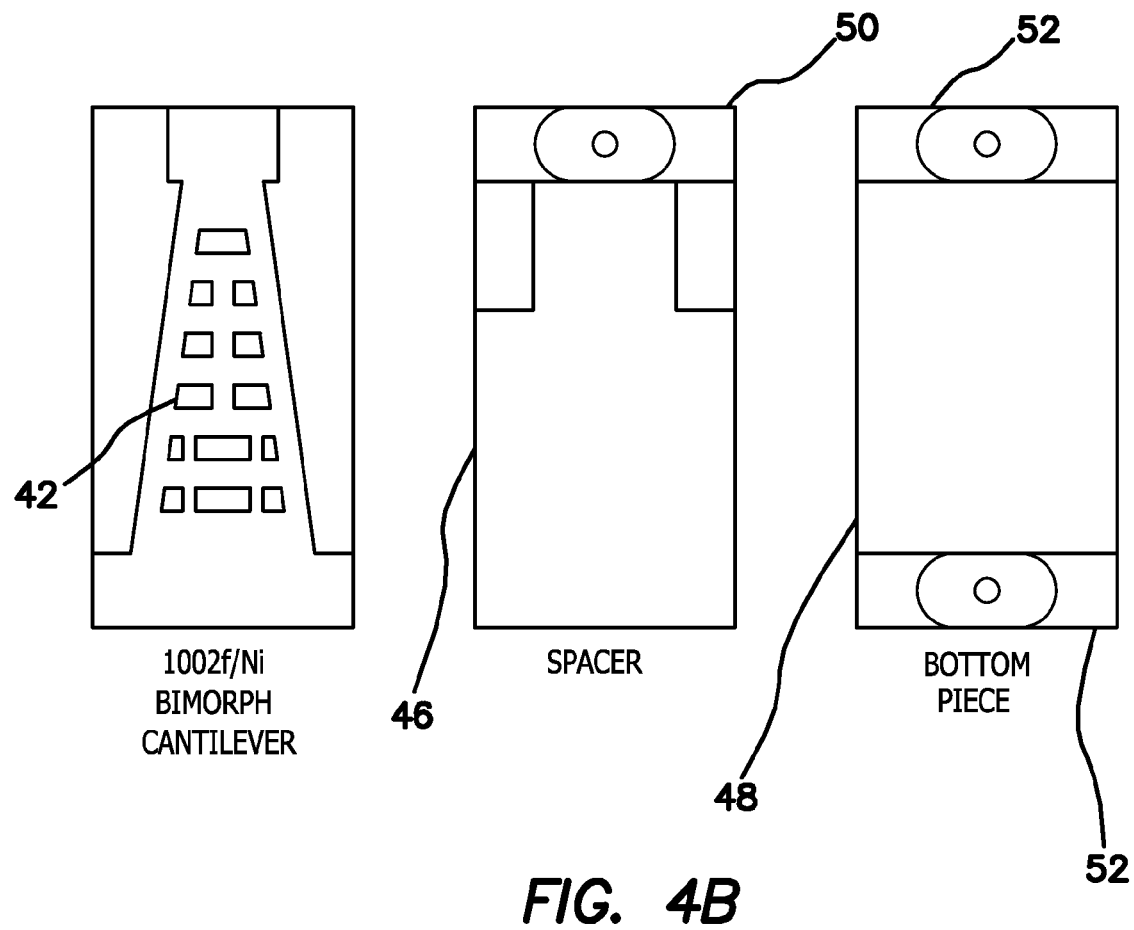

As shown in FIG. 4a, a bimorph switch 36 that can be integrated onto a printed circuit board 40. The design is based on economic materials such as polymers and nickel that are common to printed circuit board fabrication. Switches 36 can be directly embedded within the RFID tag 14 during flexible PCB fabrication. As shown in FIG. 4b cantilever 42 of FIG. 4a is comprised of a patterned bimorph layer of EPON™ resin/Ni disposed on a spacer 46 having an end conductive segment 50, which in turn lies on a bottom piece 48 with end conductive segments 52.

Figure 5:
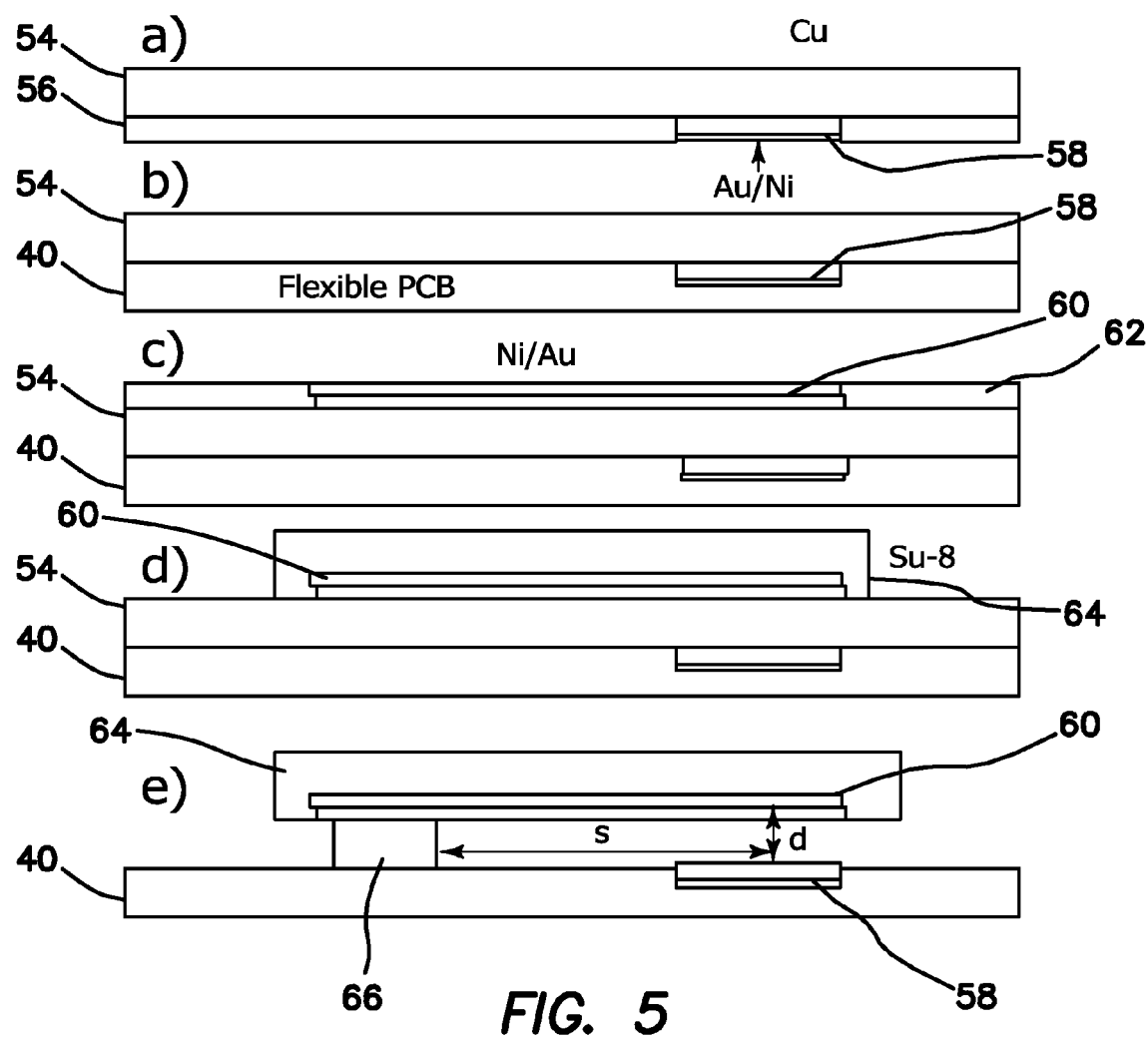

In another embodiment the fabrication process to integrated a bimorph MEMS sensor switch 36 on a flexible PCB 40 is shown in the steps a)-e) in FIG. 5. The fabrication starts with a 25 μm thick copper foil 54. The backside of foil 54 is patterned with a mask 56 and a bottom electrode 58 of AU/Ni is electroplated thereon at step a) in FIG. 5. The bottom layer of the foil is then laminated onto PCB substrate 40 in step b) in FIG. 5. The top side of foil 54 is patterned with mask 62 and plated with a Ni/Au electrode 60 in step c) in FIG. 5. Mask 62 is removed and a patterned layer SU-8 photoresist 64 is disposed on the topside of the foil 54 over electrode 60. The copper layer 54 is released in step e) in FIG. 5 leaving a connecting segment 66 of copper between PCB layer 40 and electrode 60, which is now counterpoised over lower electrode 58 and spaced apart from it by a distance, d, at a distance, s, from segment 66.

Many alterations and modifications may be made by those having ordinary skill in the art without departing from the spirit and scope of the invention. Therefore, it must be understood that the illustrated embodiment has been set forth only for the purposes of example and that it should not be taken as limiting the invention as defined by the following invention and its various embodiments.

Therefore, it must be understood that the illustrated embodiment has been set forth only for the purposes of example and that it should not be taken as limiting the invention as defined by the following claims. For example, notwithstanding the fact that the elements of a claim are set forth below in a certain combination, it must be expressly understood that the invention includes other combinations of fewer, more or different elements, which are disclosed in above even when not initially claimed in such combinations. A teaching that two elements are combined in a claimed combination is further to be understood as also allowing for a claimed combination in which the two elements are not combined with each other, but may be used alone or combined in other combinations. The excision of any disclosed element of the invention is explicitly contemplated as within the scope of the invention.

The words used in this specification to describe the invention and its various embodiments are to be understood not only in the sense of their commonly defined meanings, but to include by special definition in this specification structure, material or acts beyond the scope of the commonly defined meanings. Thus if an element can be understood in the context of this specification as including more than one meaning, then its use in a claim must be understood as being generic to all possible meanings supported by the specification and by the word itself.

The definitions of the words or elements of the following claims are, therefore, defined in this specification to include not only the combination of elements which are literally set forth, but all equivalent structure, material or acts for performing substantially the same function in substantially the same way to obtain substantially the same result. In this sense it is therefore contemplated that an equivalent substitution of two or more elements may be made for any one of the elements in the claims below or that a single element may be substituted for two or more elements in a claim. Although elements may be described above as acting in certain combinations and even initially claimed as such, it is to be expressly understood that one or more elements from a claimed combination can in some cases be excised from the combination and that the claimed combination may be directed to a subcombination or variation of a subcombination.

Insubstantial changes from the claimed subject matter as viewed by a person with ordinary skill in the art, now known or later devised, are expressly contemplated as being equivalently within the scope of the claims. Therefore, obvious substitutions now or later known to one with ordinary skill in the art are defined to be within the cope of the defined elements.

The claims are thus to be understood to include what is specifically illustrated and described above, what is conceptionally equivalent, what can be obviously substituted and also what essentially incorporates the essential idea of the invention.

We claim:

1. An apparatus for providing environmental monitoring of an item comprising:
    an RFID tag;
    a switch for sensing an environmental parameter to which the item is subjected, and coupled to the RFID tag so that a measurement of the sensed environmental parameter can be stored, the RFID tag for providing remote readout of the sensed environmental parameter;
    a microprocessor configured to determine if the sensed environmental parameter has exceeded a pre-determined threshold or if the sensed environmental parameter has changed since a previous measurement; and
    a memory element coupled to the switch to store the sensed environmental parameter if and only if the sensed environmental parameter has exceeded the pre-determined threshold or has changed since a previous measurement; and
    a battery coupled to the switch,
    where the RFID tag, microprocessor and memory element are coupled to the battery through the switch, power being drawn from the battery to the RFID tag and microprocessor only when the environmental parameter has been sensed, or to the RFID tag, microprocessor and memory element only when the environmental parameter is stored in the memory element when the sensed environmental parameter has exceeded the pre-determined threshold or if the sensed environmental parameter has changed since the previous measurement,
        whereby remote readout of the measurement of the sensed environmental parameter with the RFID tag provides an environmental history of individual, perishable items over a prolonged time during transportation and distribution.

2. The apparatus of claim 1 where the switch senses temperature, pressure, humidity, or acceleration.

3. The apparatus of claim 1 further comprising a switch in which the cantilever indicates whether a threshold value of the sensed environmental parameter has been reached or exceeded.

4. The apparatus of claim 1 where the switch comprises a MEMS bi-material cantilever and where the sensed environmental parameter is temperature.

5. The apparatus of claim 3 where the threshold value of the sensed environmental parameter is a maximum permitted temperature.

6. The apparatus of claim 3 where the threshold value of the sensed environmental parameter is a minimum permitted temperature.

7. The apparatus of claim 1 further comprising a plurality of switches for sensing a corresponding plurality of environmental parameters to which the item is subjected, the plurality of switches being coupled to the RFID tag for recordal of the plurality of environmental parameters and to provide remote readout of the sensed plurality of environmental parameters,
where the RFID tag, microprocessor and memory element are coupled to the battery through each of the plurality of switches, power being drawn from the battery only when the microprocessor senses that the predetermined threshold has been exceeded or the sensed environmental parameter has changed since a previous measurement.

8. The apparatus of claim 1 further comprising a flexible printed circuit board on which the RFID tag and switch are mounted, the switch being fabricated directly on the flexible printed circuit board for temperature, humidity, acceleration or orientation sensing.

9. The apparatus of claim 7 where the plurality of switches are arranged and configured to sense whether a temperature range has been maintained at all times for the monitored item.

10. The apparatus of claim 7 where the tag is arranged and configured to provide a readout if any past event characterized by at least one of a plurality of sensed environmental parameters signified that a predefined environmental condition has been exceeded.

11. A method for providing environmental monitoring of an item comprising:
sensing an environmental parameter to which the item is subjected with activation of a passive switch;
determining if the sensed environmental parameter has exceeded a pre-determined threshold or if the sensed environmental parameter has changed since a previous measurement using an a data processing circuit therefor;
storing a measurement of the sensed environmental parameter in a memory element upon the event of activation of the switch if and only if the sensed environmental parameter has exceeded the pre-determined threshold or has changed since a previous measurement as determined by the data processing circuit; and
providing remote readout of the measurement of the sensed environmental parameter with an RFID tag; and
providing power from a thin-film battery to the data processing circuit and RFID tag through the switch only when the environmental parameter has been sensed, or to the data processing circuit, memory element and RFID tag through the switch the only when the environmental parameter is stored in the memory element when the sensed environmental parameter has exceeded the pre-determined threshold or if the sensed environmental parameter has changed since the previous measurement, so that an environmental history of individual, perishable items over a prolonged time during transportation and distribution is provided.

12. The method of claim 11 where the item is a biological or medical item and further comprising storing information in the RFID tag specifically relating to the biological or medical item to provide the information combined with stored sensed environmental parameters to which the item has been subject for inventory monitoring or distribution of blood, organs and biological materials.

13. The method of claim 11 where the environmental history is stored and further comprising adjusting the rate at which the environmental parameter is sensed and stored in real time to save energy consumption.

14. The method of claim 11 further comprising rejecting any item experiencing a hostile environment for an extended period of time through an RFID screening conducted by a recipient of the item.

15. The method of claim 11 further comprising:
sensing a plurality of environmental parameters to which the item is subjected with selective activation of at least one of a corresponding plurality of switches;
storing a corresponding plurality of measurements of the sensed environmental parameters in a memory element upon activation of at least one of a corresponding plurality of switches;
providing remote readout of the plurality of measurements of the sensed environmental parameters with an RFID tag, where the plurality of switches are arranged and configured to sense whether a predetermined environmental parametric range has been maintained at all times for the monitored item as determined by the data processing circuit; and
providing power to the data processing circuit, the memory element and the RFID tag from a thin-film battery through each of the switches only on activation of the switch.

16. The apparatus of claim 1 where the switch is integrated directly into the RFID tag.

17. The apparatus of claim 15 where the switch is integrated into a flexible PCB with the RFID tag.

18. The apparatus of claim 1 further comprising a high resolution active sensors of an environmental parameter coupled to the RFID tag and activated by the switch.

* * * * *